United States Patent
Tunmu et al.

(10) Patent No.: US 7,660,538 B2
(45) Date of Patent: Feb. 9, 2010

(54) OPTICAL BURST MODE RECEIVER

(75) Inventors: Chia Cheih Tunmu, Taoyuan County (TW); Steven S. W. Lee, Taoyuan County (TW); Chu Hsun Chang, Kaohsiung (TW); Po-Chun Chiang, Taipei County (TW); Chih-Feng Cheng, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 493 days.

(21) Appl. No.: 11/480,423

(22) Filed: Jul. 5, 2006

(65) Prior Publication Data

US 2007/0154226 A1    Jul. 5, 2007

(30) Foreign Application Priority Data

Dec. 30, 2005    (TW) .............................. 94147656 A

(51) Int. Cl.
*H04B 10/06*    (2006.01)
(52) U.S. Cl. .................. 398/210; 398/207; 398/212
(58) Field of Classification Search .......... 398/202–214
See application file for complete search history.

(56) References Cited

U.S. PATENT DOCUMENTS

2002/0063937 A1* 5/2002 Kikuchi ...................... 359/189
2003/0067662 A1* 4/2003 Brewer et al. ............... 359/189
2004/0190912 A1* 9/2004 Seo et al. ..................... 398/202
2005/0281565 A1* 12/2005 Duanmu et al. ............. 398/214

FOREIGN PATENT DOCUMENTS

TW    1242941 B    11/2005

* cited by examiner

*Primary Examiner*—Dzung D Tran
(74) *Attorney, Agent, or Firm*—Birch, Stewart, Kolasch & Birch, LLP

(57) ABSTRACT

An optical burst mode receiver comprises a photo-detector receiving an optical signal for conversion to a current signal, a transimpedance amplifier receiving and converting the current signal into first and second transmit signals, a limiting amplifier comprising first and second input terminals and an output terminal generating a data signal, and a control circuit coupled to the first and second transmit signals to verify that if the optical signal is valid. The control circuit is further coupled to the first and second input terminals of the limiting amplifier. When the optical signal is valid, the control circuit provides the first and second input terminals with the first and second transmit signals respectively to generate the data signal. When the optical signal is invalid, the control circuit provides the first and second input terminals with distinct voltage levels to maintain the data signal at a steady level.

4 Claims, 4 Drawing Sheets

OPTICAL BURST MODE RECEIVER

BACKGROUND OF THE INVENTION

1. Field of the Invention

The invention relates to optical burst mode reception, and in particular to an optical burst mode receiver not affected by noise when no optical signal is received.

2. Description of the Related Art

Optical burst mode receivers receive optical signals from a plurality of optical communication network devices connected in parallel. Because of the discrete transmission distances data breaks occur. The optical receiver is incapable of determining duration of breaks. Data with such breaks are referred to as burst mode. Differing intensities and qualities of the received optical signals require a technique that can identify the data received by optical burst mode receivers.

FIG. 1 shows a conventional burst mode receiver that comprises an optical photo-detector 11, a transimpedance amplifier 12, and a limiting amplifier 13. The photo-detector 11 is operative to receive an optical signal L1 and convert the received optical signal to a current signal S1. The intensity of the optical signal L1 affects the value of the current signal S1. The transimpedance amplifier 12 is operative to receive the current signal S1 and to convert the current signal S1 to a first transmit signal S2 and a second transmit signal S3. The current signal S1 is amplified and shifted to generate the first transmit signal S2. The first transmit signal S2 and the second transmit signal S3 are symmetric with respect to a DC current. The limiting amplifier 13 is operative to receive the first transmit signal S2 and the second transmit signal S3 to generate a digital data signal S4.

The limiting amplifier 13 amplifies burst mode signals received by the optical burst mode receiver. However, limiting amplifier 13 oscillates, generating noise, even though no optical signal is received. The long-term oscillation degrades the limiting amplifier 13. Some available solutions attempt to integrate or feed feedback to the single input terminal or both input terminals of the limiting amplifier 13. Hence, when no optical signal is received, the input terminals of the limiting amplifier 13 are at different voltage levels, preventing oscillation caused by noise. However, the above-mentioned solutions increase the time consumption and affect data quality, with attendant unreliable data determination.

BRIEF SUMMARY OF THE INVENTION

The invention provides an optical burst mode receiver comprising a photo-detector receiving an optical signal and converting the optical signal to a current signal, a transimpedance amplifier receiving the current signal and converting the current signal to a first transmit signal and a second transmit signal, a limiting amplifier, and a control circuit determining whether the optical signal is valid based on the first transmit signal and the second transmit signal. The limiting amplifier comprises a first input terminal, a second input terminal, and an output terminal. The output terminal is operative to output a data signal. The control circuit is further coupled to the first input terminal and the second input terminal of the limiting amplifier. If the optical signal is valid, the limiting amplifier couples the first input terminal and the second input terminal with the first transmit signal and the second transmit signal respectively, and generates the data signal. If the optical signal is invalid, the limiting amplifier maintains the data signal at a steady level by providing the first input terminal and the second input terminal with different voltage levels.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The invention provides a solution to shortcomings of limiting amplifiers. To prevent the limiting amplifier from oscillating for the noise, a switch circuit with instantaneous response provides input terminals of the limiting amplifier with distinct voltage levels when no optical signal is received by the optical burst mode receiver.

Figure 1:
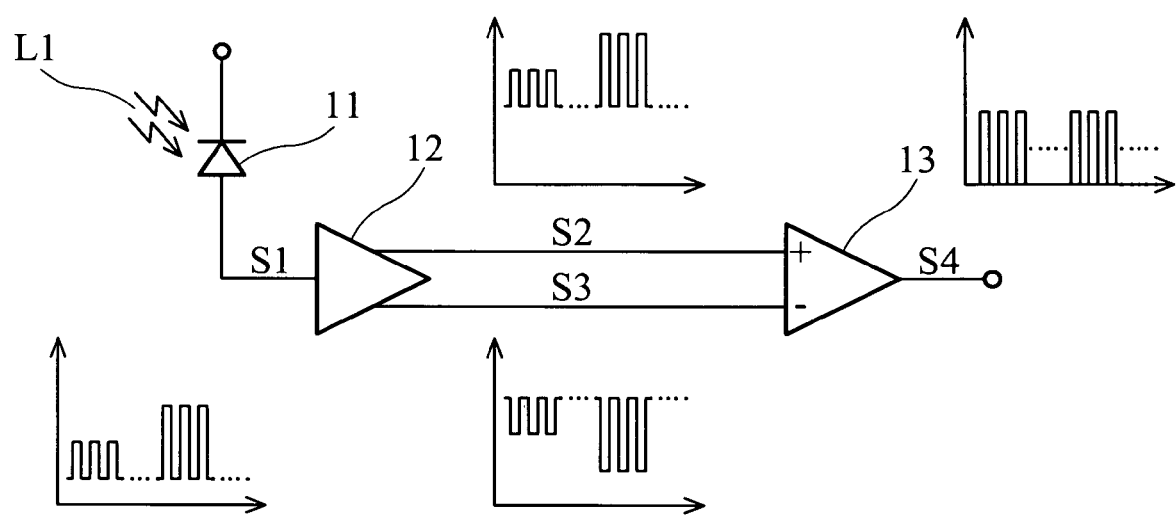
FIG. 1 shows a conventional optical burst mode receiver.
Figure 2:
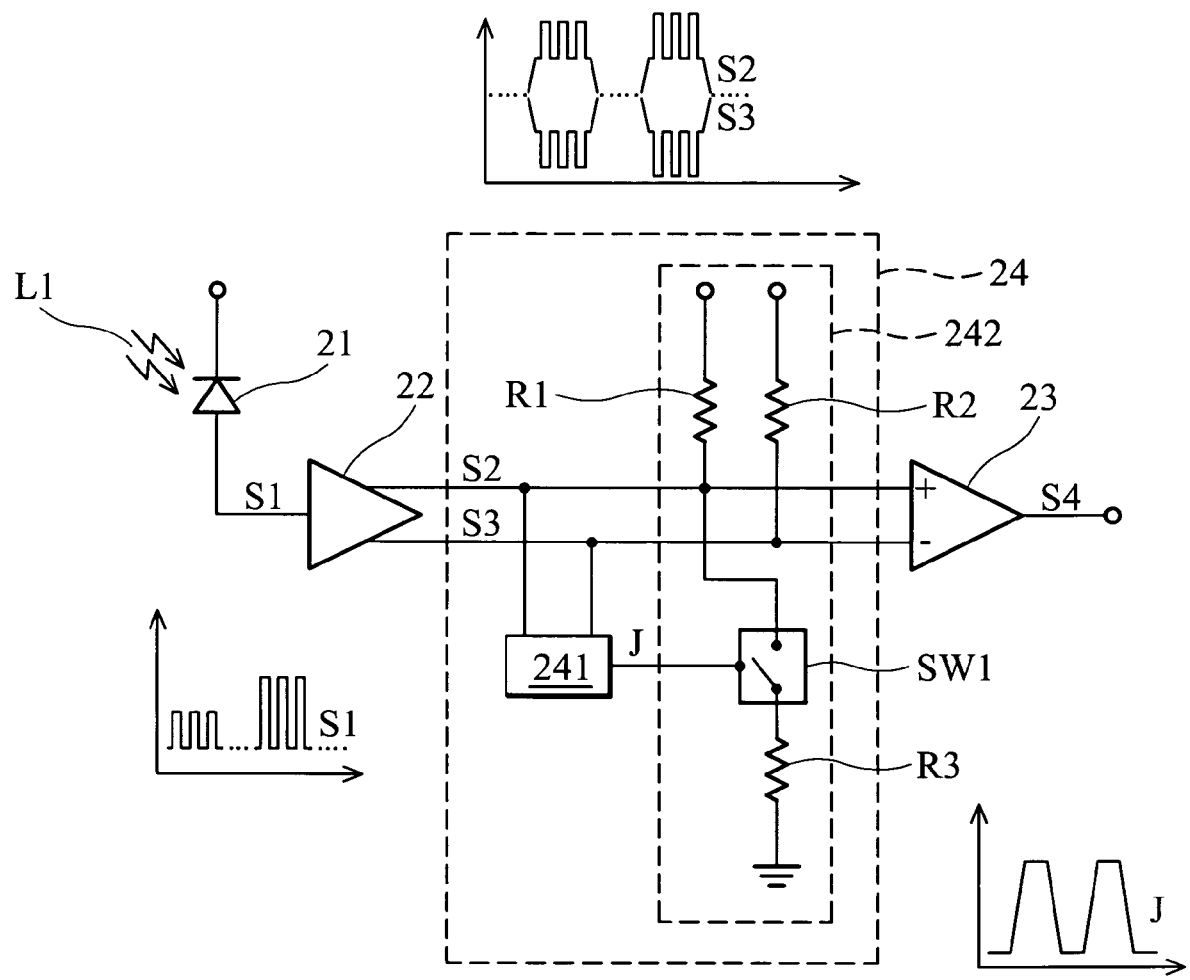
FIG. 2 is a functional diagram of an optical burst mode receiver of the invention.

FIG. 2 is a functional diagram of an optical burst mode receiver of the invention. The optical burst mode receiver comprises a photo-detector 21, a transimpedance amplifier 22, a limiting amplifier 23, and a control circuit 24. The photo-detector 21 is operative to receive an optical signal L1 and to convert the optical signal L1 to a current signal S1. The value of the current signal S1 is dependent on the intensity of the optical signal L1. The transimpedance amplifier 22 is operative to receive the current signal S1 and convert the current signal S1 to a first transmit signal S2 and a second transmit signal S3. The current signal S1 is amplified and shifted to generate the first transmit signal S2. The first transmit signal S2 and the second transmit signal S3 are symmetric with respect to a DC current.

The control circuit 24 is coupled between the transimpedance amplifier 22 and the limiting amplifier 23. The control circuit comprises a detection circuit 241, coupled to the first transmit signal S2 and the second transmit signal S3, generating a determination signal J. The determination signal is valid if the optical signal is valid. The control circuit 24 further comprises a switch circuit 242, coupled with the first input terminal and the second input terminal of the limiting amplifier 23, adjusting the signals coupled to the first and second input terminals according to the determination signal J.

The switch circuit 242 comprises a first resistor R1, a second resistor R2, and an adjusting circuit which comprises a switch SW1 and a third resistor R3. The first resistor R1 comprises a first terminal coupled to the first transmit signal and the first input terminal of the limiting amplifier 23, and a second terminal coupled to a reference voltage. The second resistor R2 comprises a first terminal coupled to the second transmit signal and the second input terminal of the limiting amplifier 23, and a second terminal coupled to the reference voltage. The first resistor and the second resistor have equal resistance. The switch SW1 receives the determination signal J and connects with the third resistor R3 in series for coupling to a ground voltage.

When the determination signal J is valid, the switch SW1 turns off, the first input terminal and the second input terminal of the limiting amplifier 23 are coupled to the first transmit signal S2 and the second transmit signal S3 respectively, generating the data signal S4. When the determination signal J is invalid, the switch SW1 turns on to couple the first input terminal of the limiting amplifier 23 to the ground via the third resistor R3. Consequently, the first input terminal and the second input terminal of the limiting amplifier 23 are coupled distinct voltage levels and the data signal S4 is at a steady level.

The switch circuit 242 is controlled by the determination signal J. When the determination signal J is valid, the switch SW1 is in a first mode to provide the limiting amplifier 23 with the first transmit signal S2 and the second transmit signal S3 to generate the data signal S4. When the determination signal J is invalid, the switch SW1 is in a second mode to couple the first and second input terminal with distinct voltage levels to maintain the data signal S4 at a steady level. The embodiment described in FIG. 2 is only an example of the invention. Those skilled in the art will be familiar with various ways of implementing the described function of the switch circuit.

Figure 3A:
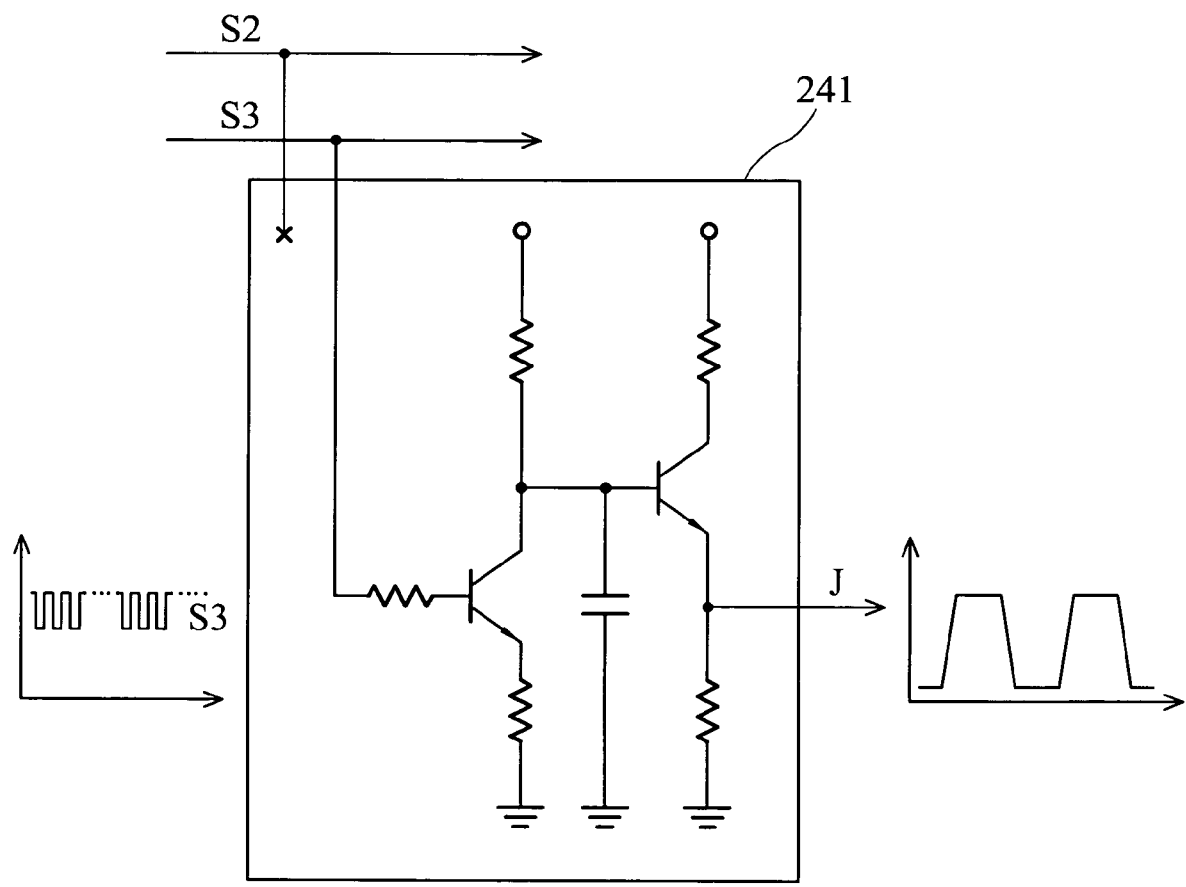
FIG. 3A shows an exemplary embodiment of the detection circuit 241 of FIG. 2.

FIG. 3A shows an exemplary embodiment of the detection circuit 241 of FIG. 2. As shown in FIG. 3A, the detection circuit 241 comprises an automatic level control circuit. The automatic level control circuit comprises an input terminal coupled to the second transmit signal S3, and an output terminal for the determination signal J. The automatic level control circuit works as a low-pass circuit by charging the capacitor via the transistors. A signal generated by the automatic level control circuit is at a high voltage level (valid) if the optical signal L1 is valid, and at a low voltage level (around the ground voltage, indicating an invalid signal) if the optical signal L2 is invalid. Another embodiment (not shown) of the detection circuit 241 couples the input terminal of the automatic level control circuit described in FIG. 3A to the first transmit signal S2 to take the place of the second transmit signal S3, modifying the corresponding circuit shown in FIG. 3A.

Figure 3B:
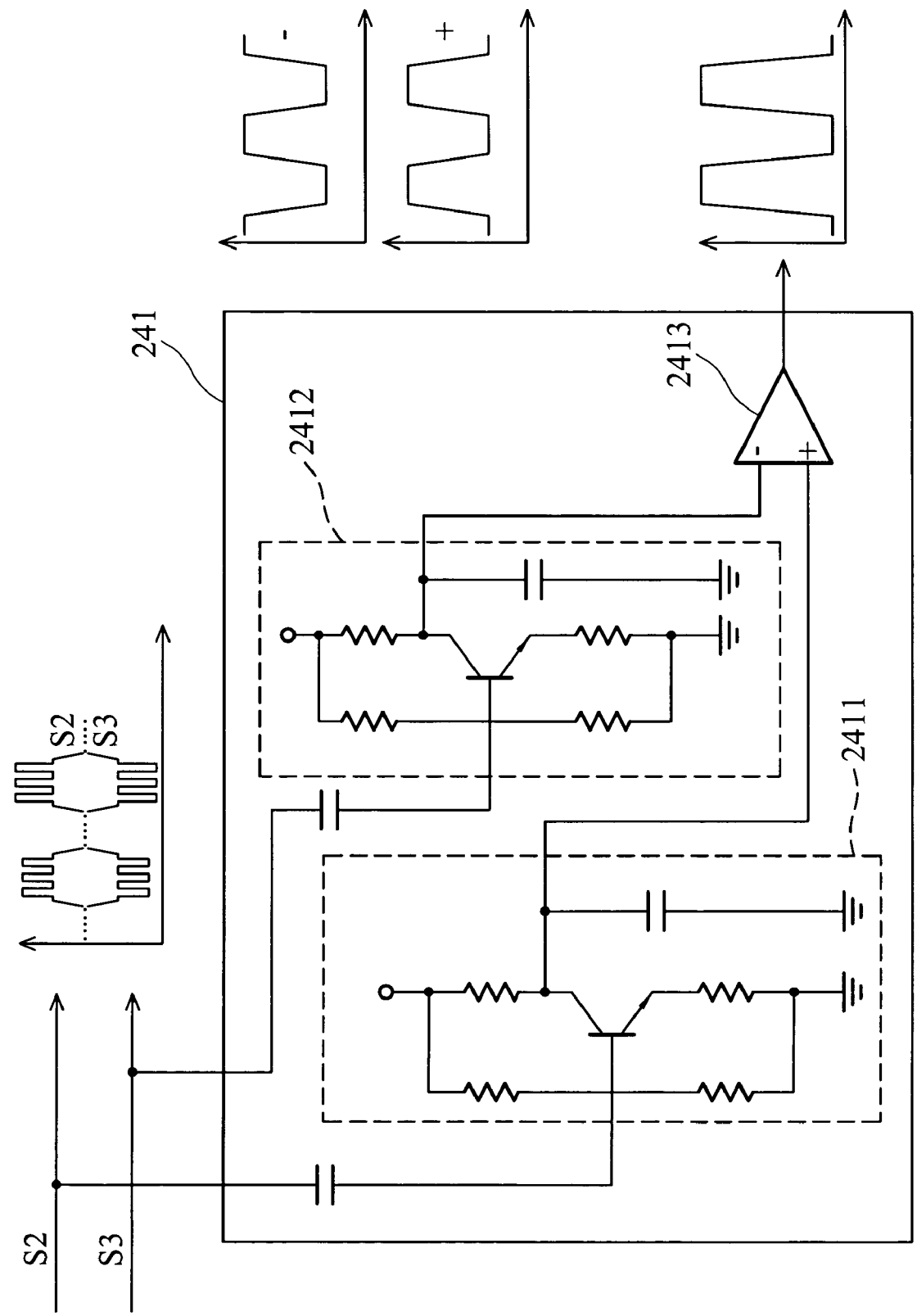
FIG. 3B shows another exemplary embodiment of the detection circuit 241.

FIG. 3B shows another exemplary embodiment of the detection circuit 241. As shown in FIG. 3B, the detection circuit 241 comprises a first automatic level control circuit 2411, a second automatic level control circuit 2412, and a comparator 2413. The comparator 2413 comprises a first input terminal (positive input of the comparator), a second input terminal (negative input of the comparator), and an output terminal which outputs the determination signal J. The first automatic level control circuit 2411 comprises an input terminal coupled to the first transmit signal S2, and an output terminal coupled to the first input terminal of the comparator. The second automatic level control circuit 2412 comprises an input terminal coupled to the second transmit signal S3, and an output terminal coupled to the second input terminal of the comparator. When the optical signal L1 is valid, the voltage value of the output terminal of the first automatic level control circuit 2411 exceeds the voltage value of the output terminal of the second automatic level control circuit 2412, and the determination signal J generated by the comparator 2413 is at logic high (valid). When the optical signal L1 is invalid, the voltage value of the output terminal of the first automatic level control circuit 2411 is lower than the voltage value of the output terminal of the second automatic level control circuit 2412, and the determination signal J generated by the comparator 2413 is at logic low (invalid).

The detection circuit 241 is operative to generate a determination signal J to determine whether the optical signal L1 is valid. The embodiments described in FIG. 3A and FIG. 3B are examples of the invention. Those skilled in the art will be familiar with various ways of implementing the described function of the detection circuit.

With the invention, only a simple circuit is required to overcome the noise effect of the limiting amplifier. If the signal received by the receiver is invalid, the first input terminal and the second terminal of the limiting amplifier are coupled to distinct voltage values to maintain the data signal at a steady level to prevent oscillations generated by noise. Moreover, if the optical signal is valid, no extra signal processing is necessary and the signals received by the limiting amplifier have improved quality. The sensitivity of the limiting amplifier can be fully utilized.

While the invention has been described by way of example and in terms of preferred embodiment it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical burst mode receiver, comprising
a photo-detector receiving an optical signal and converting the optical signal to a current signal;
a transimpedance amplifier receiving the current signal and converting the current signal to a first transmit signal and a second transmit signal;
a limiting amplifier comprising a first input terminal, a second input terminal, and an output terminal, wherein the output terminal is operative to output a data signal; and
a control circuit determining whether the optical signal is valid based on the first transmit signal and the second transmit signal, the control circuit further coupled to the first input terminal and the second input terminal of the limiting amplifier,
wherein if the optical signal is valid, the control circuit couples the first input terminal and the second input terminal of the limiting amplifier to the first transmit signal and the second transmit signal, respectively, to generate the data signal,
wherein if the optical signal is invalid, the control circuit couples the first and second input terminals of the limiting amplifier to different voltage levels to maintain the data signal outputted by the limiting amplifier at a steady level,
wherein the control circuit further comprises:
a detection circuit coupled to the first transmit signal and the second transmit signal to generate a determination signal, wherein the determination signal is valid if the optical signal is valid; and
a switching circuit adjusting signals at the first and second input terminals of the limiting amplifier according to the determination signal, wherein the switching circuit further comprises:
a first resistor comprising a first terminal coupled to the first transmit signal and the first input terminal of the limiting amplifier, and a second terminal coupled to a reference voltage;
a second resistor comprising a first terminal coupled to the second transmit signal and the second input terminal of the limiting amplifier, and a second terminal coupled to the reference voltage, wherein the first resistor and the second resistor have equal resistance; and
an adjusting circuit, coupled to the first input terminal of the limiting amplifier and comprising a switch receiving the determination signal, wherein if the determination signal is invalid, the switch turns on to couple the first input terminal of the limiting amplifier to a ground via a third resistor.

2. The optical burst mode receiver as claimed in claim 1, wherein the detection circuit comprises an automatic level control circuit comprising an input terminal coupled to the first transmit signal, and an output terminal generating the determination signal.

3. The optical burst mode receiver as claimed in claim 1, wherein the detection circuit comprises an automatic level control circuit comprising an input terminal coupled to the second transmit signal, and an output terminal generating the determination signal.

4. The optical burst mode receiver as claimed in claim 1, wherein the detection circuit comprises:
 a comparator comprising a first input terminal, a second input terminal, and an output terminal generating the determination signal;
 a first automatic level control circuit comprising an input terminal coupled to the first transmit signal, and an output terminal coupled to the first input terminal of the comparator; and
 a second automatic level control circuit comprising an input terminal coupled to the second transmit signal, and an output terminal coupled to the second input terminal of the comparator.

* * * * *